US009061700B2

(12) United States Patent
Kifuku

(10) Patent No.: US 9,061,700 B2
(45) Date of Patent: Jun. 23, 2015

(54) ELECTRIC POWER STEERING CONTROL APPARATUS

(75) Inventor: Takayuki Kifuku, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1194 days.

(21) Appl. No.: 12/233,804

(22) Filed: Sep. 19, 2008

(65) Prior Publication Data

US 2009/0254252 A1    Oct. 8, 2009

(30) Foreign Application Priority Data

Apr. 8, 2008   (JP) ................................. 2008-100228

(51) Int. Cl.
*B62D 5/04*   (2006.01)
*B62D 5/00*   (2006.01)

(52) U.S. Cl.
CPC ............... *B62D 5/0463* (2013.01); *B62D 5/04* (2013.01); *B62D 5/00* (2013.01)

(58) Field of Classification Search
CPC ............................ B62D 5/0463; B62D 5/0472
USPC .................... 701/41–44; 318/400.15, 400.23, 318/432–434; 180/400, 412, 443, 446
See application file for complete search history.

(56) References Cited

U.S. PATENT DOCUMENTS

| | | | | |
|---|---|---|---|---|
| 5,182,711 | A * | 1/1993 | Takahashi et al. | 701/41 |
| 6,054,827 | A * | 4/2000 | Takatsuka et al. | 318/474 |
| 6,407,524 | B1 * | 6/2002 | Endo et al. | 318/432 |
| 6,694,237 | B2 * | 2/2004 | Kifuku et al. | 701/41 |
| 6,827,177 | B2 * | 12/2004 | Asada et al. | 180/446 |
| 7,604,088 | B2 * | 10/2009 | Nishizaki et al. | 180/446 |
| 2005/0264248 | A1 * | 12/2005 | Tsunoda | 318/434 |
| 2006/0001392 | A1 * | 1/2006 | Ajima et al. | 318/432 |
| 2006/0042860 | A1 * | 3/2006 | Endo et al. | 180/412 |
| 2006/0069481 | A1 * | 3/2006 | Kubota et al. | 701/41 |

(Continued)

FOREIGN PATENT DOCUMENTS

| | | |
|---|---|---|
| EP | 1900606 B1 | 9/2007 |
| EP | 1882623 A2 | 1/2008 |

(Continued)

OTHER PUBLICATIONS

"Control Theory", Jul. 25, 2004, Wikipedia.*

(Continued)

*Primary Examiner* — Helal A Algahaim
*Assistant Examiner* — Genna Mott
(74) *Attorney, Agent, or Firm* — Sughrue Mion, PLLC

(57) ABSTRACT

Provided is an electric power steering control apparatus for an electric power steering system equipped with a torque sensor for detecting a steering torque of the steering system and a motor for generating a torque for assisting the steering torque, including a motor target torque calculation unit for calculating a torque of the motor in response to a steering torque signal from the torque sensor and a motor-applied voltage calculation unit for calculating a voltage applied to the motor in response to a motor target torque signal from the motor target torque calculation unit, in which the motor target torque calculation unit generates the motor target torque signal indicating a motor target torque whose ratio to a steering torque indicated by the steering torque signal is set such that an influence of a torque fluctuation of the motor on a driver becomes equal to or smaller than a predetermined value.

8 Claims, 3 Drawing Sheets

(56) References Cited

U.S. PATENT DOCUMENTS

2006/0231325 A1* 10/2006 Tamaizumi .................. 180/446
2007/0107977 A1* 5/2007 Shibata ........................ 180/444
2008/0297077 A1* 12/2008 Kovudhikulrungsri
                                                    et al. ........................ 318/400.02

FOREIGN PATENT DOCUMENTS

| JP | 61-169368 A | 7/1986 |
| JP | 3298006 B2 | 4/2002 |
| JP | 3714843 B2 | 9/2005 |
| JP | 2006-290127 A | 10/2006 |
| JP | 2008030675 A | 2/2008 |

OTHER PUBLICATIONS

Japanese Office Action corresponding to Japanese Patent Application No. 2008-100228, dated Feb. 19, 2010.
German Office Action corresponding to German Patent Application No. 10 2008 042 858.2, dated Apr. 11, 2012.
International Preliminary Report on Patentability and Written Opinion corresponding to French Application No. FR 0857081, dated May 24, 2013.

* cited by examiner

ELECTRIC POWER STEERING CONTROL APPARATUS

BACKGROUND OF THE INVENTION

1. Field of the Invention

The present invention relates to an electric power steering system, and more particularly, to a control apparatus suited to control a motor of the electric power steering system without directly detecting a current of the motor.

2. Description of the Related Art

There is known a conventional electric power steering system that drives a motor while performing feedback control so that a motor target current calculated on the basis of a steering torque signal sent from a torque sensor coincides with a measured value of a current of the motor (e.g., JP 2001-206232 A).

There is also known another conventional electric power steering system that drives a motor on the basis of a detection signal of a steering speed and a steering torque signal without measuring a current of the motor (e.g., JP 61-169368 A).

There is also known still another conventional electric power steering system that drives a motor while performing feedback control of an estimated value of a current of the motor on the basis of a steering torque signal without measuring the current of the motor (e.g., JP 3714843 A).

Electric power steering systems, which have started its practical use as a power steering system for light passenger vehicles, have recently been applied further to ordinary passenger vehicles with heavy vehicle weights, and attempts to increase the current and output of motors of these electric power steering systems are under way. With this background, in order to detect the current of the motor using an inexpensive resistance and perform feedback control as in the case of the related art disclosed in JP 2001-206232 A, an interface circuit for inputting to a microcomputer a signal detected using the resistance is required in addition to an element of this resistance. Therefore, there is a problem in that the area of a substrate of a control apparatus needs to be increased so as to mount the interface circuit and the element of the resistance. Further, this resistance generates a large amount of heat, and hence a heat sink fitted to the control apparatus to discharge this heat needs to be enlarged. As a result, there is another problem in that enlargement of the apparatus and cost rise are incurred. In addition, there is still another problem in that a loss of power by this resistance hinders the attempt to increase the output of the motor when the current of the motor is detected using the resistance as described above.

On the other hand, with a view to suppressing the generation of heat, the loss of power, and enlargement of the apparatus resulting from the resistance for detecting the current of the motor, it is conceivable to control the current of the motor without carrying out detection thereof. For example, JP61-169368 A discloses a method in which a back electromotive force of the motor is compensated for on the basis of a steering speed detection signal to control the current of the motor in an open loop. Further, JP 3714843 A discloses a method in which the current of the motor, which is estimated from a drive voltage of the motor, is subjected to feedback control.

In general, the influences of dispersion of the resistance of windings of a motor and temperature characteristics thereof can be suppressed if a current of the motor is detected and subjected to feedback control. However, when the current of the motor is not detected as in the cases of these conventional systems, the torque of the motor changes as a result of a likelihood of changes in the current of the motor, and hence the steering torque of a driver is influenced. In these conventional systems, a disturbance in the voltage of the motor such as noise or the like is also more likely to lead to a fluctuation in the current of the motor than in cases where the current of the motor is detected. As a result, the influences of vibrations, noise, and the like are not negligible.

SUMMARY OF THE INVENTION

The present invention has been made to solve the above-mentioned problems, and it is therefore an object of the present invention to provide an electric power steering control apparatus capable of sufficiently suppressing the influences of a fluctuation in the torque of a motor and a disturbance in the motor on a driver in spite of the function of controlling the motor without directly detecting a current of the motor.

In an electric power steering control apparatus equipped with a torque sensor for detecting a steering torque of the steering system and a motor for generating a torque for assisting the steering torque, the electric power steering control apparatus of the present invention includes motor target torque calculation means for calculating a torque of the motor in response to a steering torque signal from the torque sensor and motor-applied voltage calculation means for calculating a voltage applied to the motor in response to a motor target torque signal from the motor target torque calculation means. In the electric power steering control apparatus, the motor target torque calculation means generates the motor target torque signal indicating a motor target torque whose ratio to a steering torque indicated by the steering torque signal is set such that an influence of a torque fluctuation of the motor on a driver becomes equal to or smaller than a predetermined value.

The present invention makes it possible to provide an electric power steering control apparatus capable of sufficiently suppressing the influences of a fluctuation in the torque of a motor and a disturbance in the motor on a driver in spite of problems such as the generation of heat and the like and the function of controlling the motor without directly detecting a current of the motor.

DETAILED DESCRIPTION OF THE PREFERRED EMBODIMENTS

First Embodiment

Figure 1:
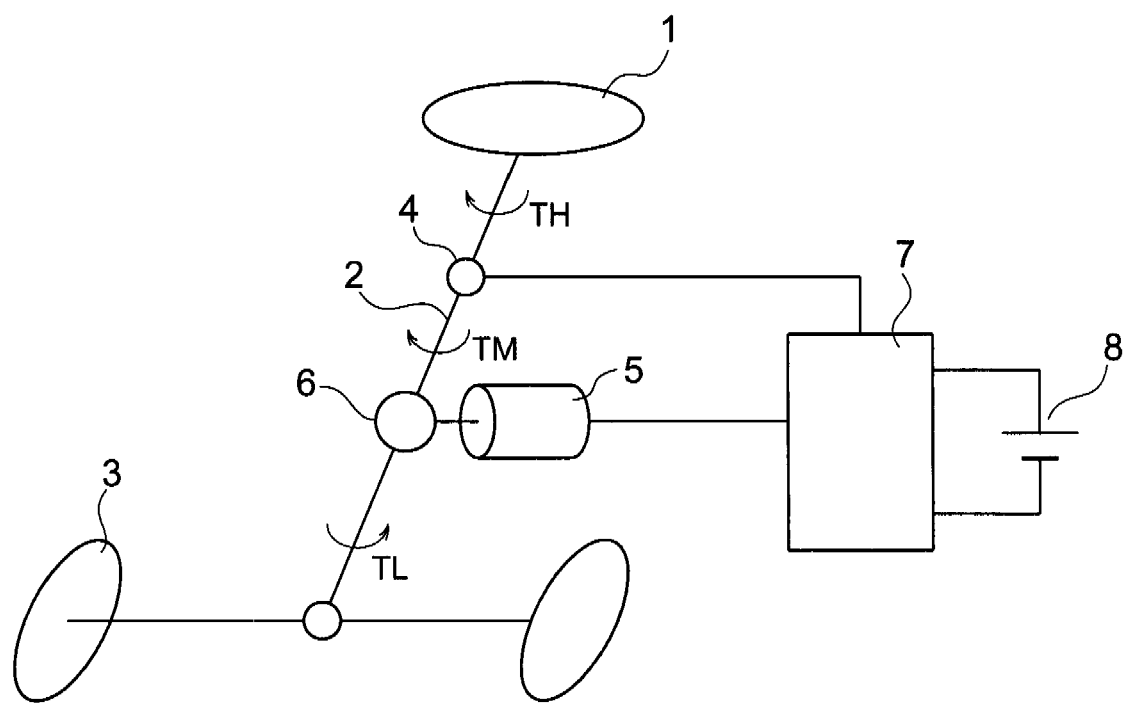
FIG. 1 is a view showing an electric power steering control apparatus according to a first embodiment of the present invention.

FIG. 1 is a view showing the construction of an electric power steering control apparatus according to the first embodiment of the present invention. A steering wheel, a steering shaft, front wheels of a vehicle, a torque sensor for detecting a steering torque of a driver, and a motor are denoted by 1, 2, 3, 4, and 5, respectively. A gear for transmitting a torque of the motor 5 to the steering shaft 2, and a controller having the torque sensor 4 connected thereto to drive and control the motor 5 are denoted by 6 and 7, respectively. A battery for supplying power to the motor 5 via the controller 7 is denoted by 8. The steering torque of the driver, an output torque of the motor 5, and a load torque transmitted from the front wheels 3 to the motor 5 and the driver are denoted by TH, TM, and TL, respectively, in terms of torques on the steering shaft 2, respectively.

Figure 2:
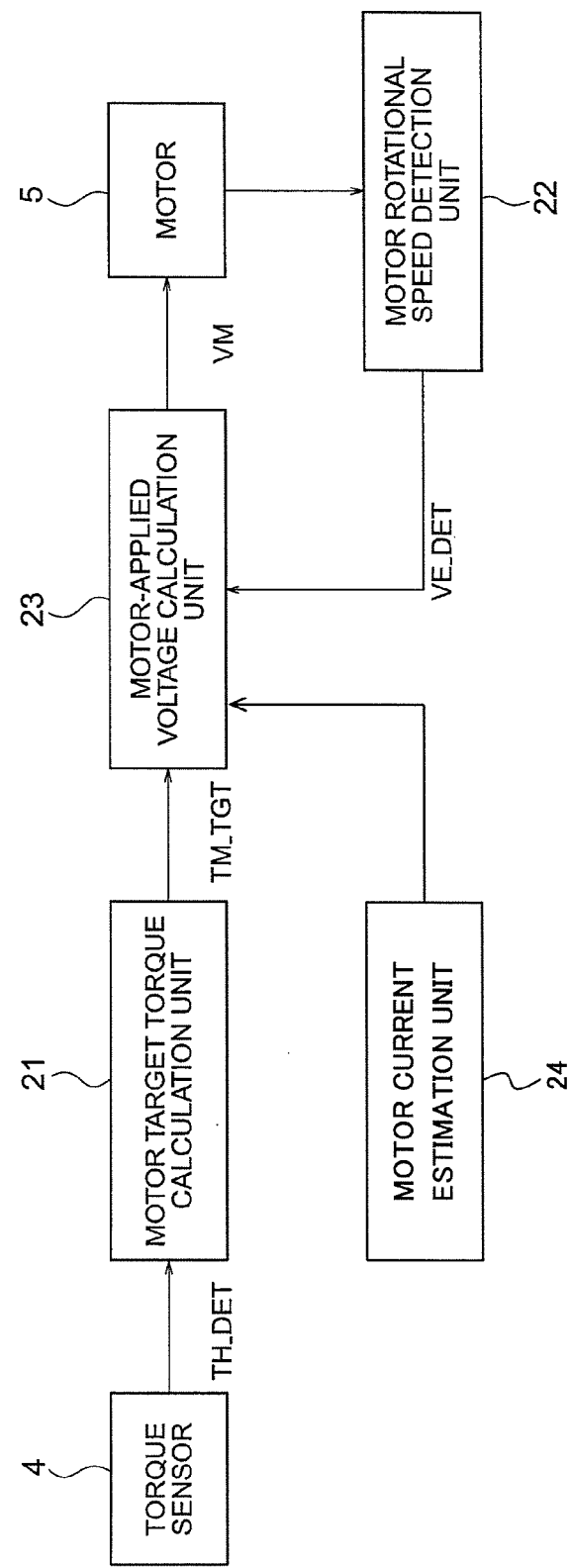
FIG. 2 is a block diagram for explaining the control of the electric power steering control apparatus according to the first embodiment of the present invention.

FIG. 2 is a block diagram for explaining an operation performed inside the controller 7. A motor target torque calculation unit for calculating a motor target torque signal TM_TGT indicating a target value of an output torque of the motor 5 in response to a steering torque signal TH_DET from the torque sensor 4 as a signal indicating a steering torque of the driver is denoted by 21. A motor rotational speed detection unit for detecting a rotational speed of the motor 5 is denoted by 22. A motor-applied voltage calculation unit for calculating a motor-applied voltage VM indicating a voltage applied to the motor 5 in response to the motor target torque signal TM_TGT from the motor target torque calculation unit 21 and a motor rotational speed signal VE_DET from the motor rotational speed detection unit 22 so as to drive the motor 5 is denoted by 23.

Figure 3:
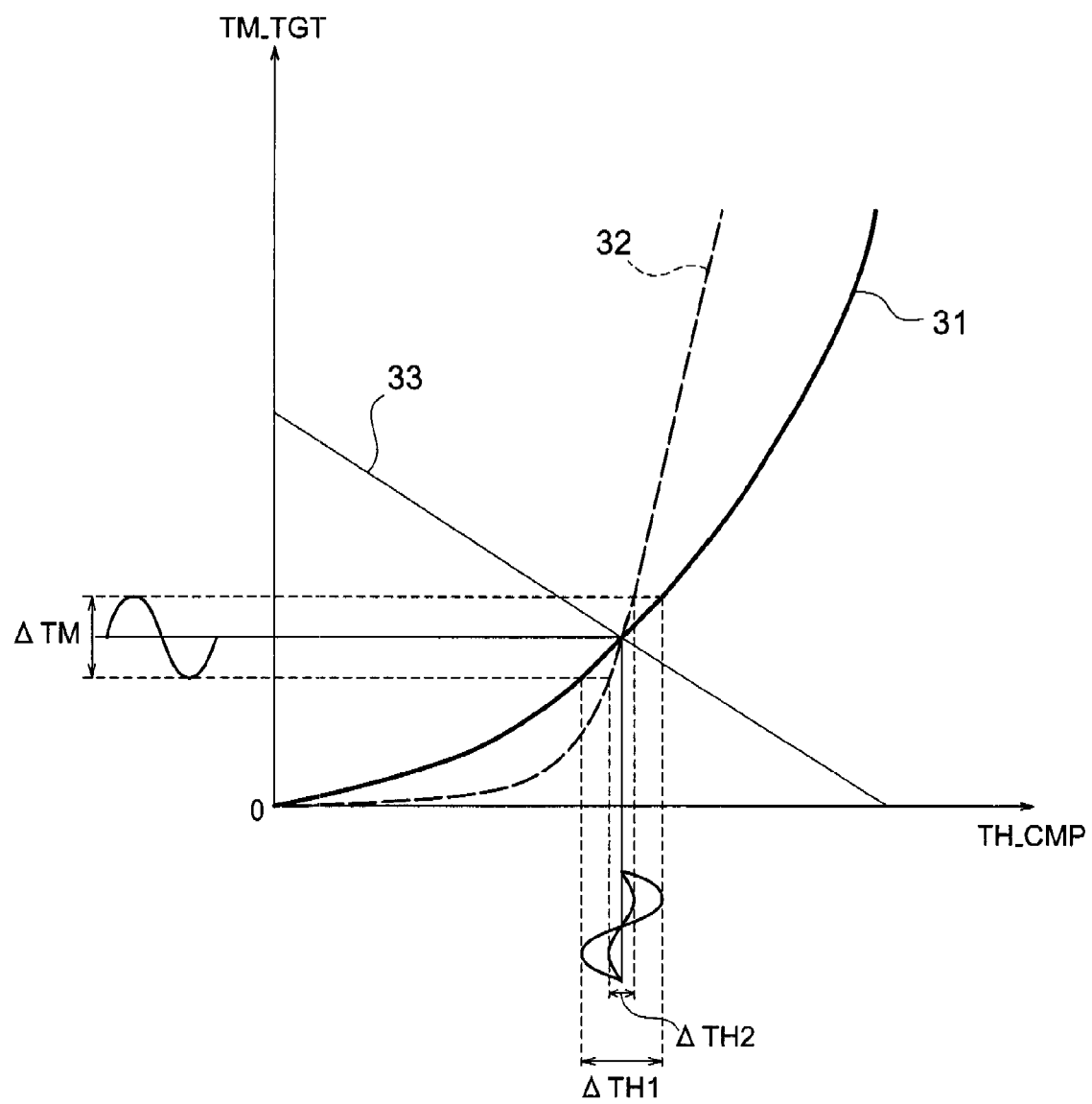
FIG. 3 is a view for explaining a relationship between steering torque and motor torque in the electric power steering control apparatus according to the first embodiment of the present invention.

FIG. 3 is a view for explaining the operation of the motor target torque calculation unit 21 according to this embodiment of the present invention. Assist maps each representing a static relationship between a signal TH_CMP obtained by subjecting the steering torque signal TH_DET to later-described phase advance compensation and the motor target torque signal TM_TGT are denoted by 31 and 32. On the other hand, a so-called load line is denoted by 33. This load line 33 is obtained by substituting TM_TGT for TM and TH_CMP for TH in an expression (1) of equilibrium among the output torque TM of the motor 5, the load torque TL, and the steering torque TH of the driver.

$$TL=TM+TH \tag{1}$$

Next, an operation is described. First of all, the motor target torque calculation unit 21 calculates a target torque of the motor 5. A steering torque of the driver detected by the torque sensor 4 is input as the steering torque signal TH_DET and subjected to phase advance compensation according to an expression (2), for example.

$$TH\_CMP=TH\_DET*(1+\tau 1s)/(1+\tau 2s) \tag{2}$$

In this expression (2), TH_CMP denotes a steering torque signal subjected to phase advance compensation, $\tau 1$ and $\tau 2$ denote constants, and s denotes a Laplace operator. Thus, a phase in the neighborhood of a crossover frequency in a loop including the torque sensor 4, the motor 5, and the controller 7 is advanced. As a result, stable operation is performed without causing oscillations.

The motor target torque signal TM_TGT is then calculated from the steering torque signal TH_CMP subjected to phase advance compensation, which is obtained using the expression (2), according to the characteristic of FIG. 3. Detailed description of FIG. 3 is now given. When a static characteristic of the motor target torque calculation unit 21 is represented by the assist map 31, an intersecting point between the load line 33 and the assist map 31 represents an operating point of the motor 5. Given that a fluctuation in the torque of the motor 5 resulting from various factors is denoted by ΔTM, the influence exerted on the steering torque TH can be read from the steering torque that has fluctuated by the above-mentioned value ΔTM around the operating point on the assist map 31, and is denoted by ΔTH1. When the gradient of the assist map 31 is increased to obtain, for example, the assist map 32, the influence of the fluctuation in the torque of the motor 5 on the steering torque decreases. In this case, a fluctuation in the steering torque for the same value ΔTM as mentioned above is denoted by ΔTH2.

The torque fluctuation ΔTM can be estimated in advance from the characteristic of the motor 5. When two specifications, namely, a width of this torque fluctuation and a width of a permissible fluctuation in the steering torque are determined, a relationship between TM_TGT and TH_CMP can be determined according to the aforementioned method.

In general, the torque fluctuation ΔTM increases as the torque of the motor increases. Therefore, with a view to suppressing the influence of this torque fluctuation ΔTM on the steering torque TH to such a degree that the driver is not seriously influenced as described above, the gradient of the relationship between TM_TGT and TH_CMP increases with increases in TH_CMP. In order to set the influence substantially constant regardless of the magnitude of TH_CMP, curves of the assist maps 31 and 32 shown in FIG. 3 are obtained.

When the hysteresis of the torque sensor 4 is not negligible in this case, a value of the hysteresis of the torque sensor 4 in terms of a torque on the steering shaft 2 is added to the fluctuations ΔTH1 and ΔTH2. Accordingly, by using a torque sensor with a small hysteresis, the influence of the hysteresis can be reduced. In determining an assist map, the hysteresis is taken into account to make it possible to sufficiently suppress the influence on the driver in spite of the hysteresis.

That is, if the torque fluctuation ΔTM can be detected by the torque sensor 4, the motor can be driven in accordance with the steering torque including this torque fluctuation ΔTH. In order to detect and control the torque fluctuation ΔTM, the hysteresis of the torque sensor 4 needs to be set equal to or smaller than the torque fluctuation ΔTH. By thus setting the hysteresis of the torque sensor 4, the influence of the torque fluctuation ΔTH of the motor on the driver can further be reduced.

A method of determining an assist map is described citing a concrete example. In this case, the fluctuation in the steering torque resulting from the torque fluctuation ΔTM of the motor is allowed to assume a value up to 0.5 Nm, which is empirically known to have a sufficiently-small influence on the driver, and a sensor with a hysteresis width of 0.3 Nm is used. When the fluctuation in the steering torque is 0.5 Nm, the output fluctuation ΔTH of the aforementioned torque sensor is obtained according to an expression (3).

$$\Delta TH=0.5-0.3=0.2 \text{ (Nm)} \tag{3}$$

When the gradient of the assist map is set according to an expression (4) in the case where the value of the output torque fluctuation of the motor 5 in terms of a torque on the steering shaft 2 is 1 Nm at the operating point of the assist map, the fluctuation in the steering torque is within a permissible range.

$$\Delta TM/\Delta TH=1/0.2=5 \tag{4}$$

(ΔTM/ΔTH: the gradient of the assist map)

Thus, the influences of the torque fluctuation of the motor and the disturbance in the motor on the driver can be sufficiently suppressed. In this manner, the characteristic of the motor target torque calculation unit 21 can be determined.

It should be noted herein that the motor 5 is a DC motor. The output torque of the motor 5 is proportional to the current thereof. Thus, the motor-applied voltage calculation unit 23 performs open-loop control of the current of the motor so as to cause the current of the motor corresponding to the motor target torque TM_TGT to flow through the motor. In this case, a back electromotive force of the motor 5 is calculated on the basis of the motor rotational speed detected by the motor rotational speed detection unit 22. As is the case with the related art, the motor-applied voltage VM is calculated from the motor target torque and the back electromotive force of the motor so as to drive the motor 5.

It should be noted herein that, as regards a static assist force of the power steering system, a current of the motor at the time when the back electromotive force is 0 V is important and is determined mainly by an applied voltage and an armature resistance. However, in the aforementioned current control, the current of the motor is influenced by dispersion of the armature resistance and temperature characteristics, and the output torque of the motor changes as a result. However, if this change in the output torque of the motor is estimated in advance and an assist map is determined as in the case of the motor target torque calculation unit according to this embodiment of the present invention, the influence on the steering torque can be reduced to a value equal to or smaller than a predetermined value. As a matter of course, an assist map may be determined by additionally taking into account a fluctuation in the current of the motor that is assumed to be caused by a disturbance in the applied voltage VM.

As described above, the electric power steering control apparatus according to this embodiment of the present invention can suppress the influence of a fluctuation in the torque of the motor on a steering torque even when a current of the motor is not detected and not to be subjected to feedback control. Thus, there is no need to provide a current sensor. Therefore, in the case where the current sensor is not provided, the size of a circuit can be reduced by the sizes of a resistance for current detection and an interface circuit for the resistance, and the generation of heat can be suppressed. Therefore, there is no need to enlarge a heat sink provided in the control apparatus, and the control apparatus can be reduced in size and cost. In addition, there is no loss of power resulting from the resistance for current detection, and hence an effect of making it possible to enhance the efficiency of the motor is also achieved.

It goes without saying that the setting of the assist map in the present invention achieves an effect of suppressing a fluctuation in a steering torque resulting from a fluctuation in the torque of the motor and a disturbance in the motor even when the present invention is applied to a case where a current sensor is provided to perform feedback control of the current of a motor.

In this embodiment of the present invention, each of the assist maps is a curve. However, the gradient of an assist map may be determined for a maximum estimated value of the torque fluctuation ΔTM. In this case, the assist map may be a straight line.

Second Embodiment

In the foregoing first embodiment of the present invention, the first embodiment is equipped with the motor rotational speed detection unit 22 to obtain the back electromotive force of the motor. However, the back electromotive force is proportional to the rotational speed of the motor. Therefore, in the case where the motor is equipped with a sensor for detecting an angle of a rotor as in the case of a brushless motor or the like, the control of current may be performed using a differential value of the angle of the rotor. In the case where the motor is equipped with a steering angle sensor, a substantially equivalent effect is achieved even by using a differential value of a steering angle detected by the steering angle sensor. In this case, the motor rotational speed detection unit 22 is not required.

In recent years, automobiles with heavy vehicle weights to which an increasing number of electric power steering systems have been applied are often equipped with steering angle sensors for the control of vehicle behavior as standard equipment. In addition, a brushless motor, which is more appropriate than a brush motor as a high-output motor necessary for an electric power steering system for an automobile with a heavy vehicle weight, is often equipped with a sensor for detecting an angle of a rotor of the motor. In such a case, when control is performed using a steering angle or a rotor angle signal without providing a unit for detecting a current of the motor or a rotational speed of the motor as in the case of this embodiment of the present invention, the cost of the apparatus can be reduced due to the possibility of omitting the motor rotational speed detection unit.

Third Embodiment

In the foregoing first embodiment of the present invention, the current of the motor is controlled in the open loop. However, the current of the motor maybe estimated by a motor current estimation unit 24 and subjected to feedback control as in the case of JP 3714843 A. In this case as well, the current of the motor is more liable to fluctuate than in the case where the current of the motor is detected, and hence the apparatus according to the third embodiment of the present invention operates effectively. In this case as well as the case of the foregoing first embodiment of the present invention, the size of a circuit can be reduced by the sizes of a resistance for current detection and an interface circuit for the resistance, and the generation of heat can be suppressed, in addition to an effect of making it possible to suppress the influence of a fluctuation in the torque of the motor on a steering torque. Therefore, there is no need to enlarge a heat sink provided in the control apparatus, and the control apparatus can be reduced in size and cost. Besides, there is no loss of power resulting from the resistance for current detection, and hence an effect of enabling an enhancement of the efficiency of the motor is also achieved.

What is claimed is:
1. An electric power steering control apparatus for an electric power steering system equipped with a torque sensor for detecting a steering torque of the steering system and a motor for generating a torque for assisting the steering torque, the electric power steering control apparatus comprising:
 a motor target torque calculator configured to calculate a target torque of the motor in response to a steering torque signal from the torque sensor; and
 a motor-applied voltage calculator configured to calculate a voltage to be applied to the motor in response to a motor target torque signal from the motor target torque calculator,
 wherein the motor target torque calculator is configured to generate the motor target torque signal indicating the motor target torque whose ratio to the steering torque indicated by the steering torque signal is set such that an influence of a torque fluctuation of the motor on a driver becomes equal to or smaller than a predetermined value;
 wherein the predetermined value is set equal to or smaller than 0.5 Nm in terms of a torque on a steering shaft of the steering system,
 wherein said torque sensor is subject to phase advance compensation,
 wherein the electric power steering control apparatus is configured to control the motor without directly detecting a current of the motor, and wherein, at a time when the motor outputs a maximum torque, the torque sensor has a hysteresis width equal to or smaller than a torque fluctuation width.

2. The electric power steering control apparatus according to claim 1, wherein the torque sensor has a hysteresis width equal to or smaller than the predetermined value.

3. The electric power steering control apparatus according to claim 1, wherein the motor-applied voltage calculator is configured to calculate the voltage to be applied to the motor through open-loop control of a current of the motor in response to the motor target torque signal.

4. The electric power steering control apparatus according to claim 1, further comprising a motor current estimator configured to estimate a current of the motor,
wherein the motor-applied voltage calculator is configured to calculate the voltage to be applied to the motor through feedback control of the current of the motor in response to a difference between a value indicated by a motor current estimated value signal from the motor current estimator and a value indicated by the motor target torque signal.

5. The electric power steering control apparatus according to claim 1, wherein said phase advance compensation is provided according to the expression TH_CMP=TH_DET*(1+τ1s)/(1+τ2s),
where TH_CMP denotes a steering torque signal subjected to phase advance compensation, TH_DET is a detected steering torque signal, τ1 and τ2 denote constants, and s denotes a Laplace operator.

6. The electric power steering control apparatus according to claim 5, wherein a plurality of assist maps are provided, each representing a different static relationship between the signal TH_CMP and the motor target torque signal TM_TGT, a selection is made of an assist map from among said plurality of assist maps based on a desired gradient to compensate for fluctuation in the steering torque.

7. The electric power steering control apparatus according to claim 6, wherein in selecting an assist map, hysteresis of the torque sensor is considered.

8. The electric power steering control apparatus according to claim 6, wherein a gradient of an assist map ΔTM/ΔTH, where ΔTM is fluctuation in torque of the motor and ΔTH is a fluctuation in the steering torque, is set so that the influences of the torque fluctuation of the motor and a disturbance in the motor on the driver can be sufficiently suppressed.

* * * * *